United States Patent
Depiere

(10) Patent No.: US 11,598,691 B2
(45) Date of Patent: Mar. 7, 2023

(54) DEVICE FOR DETECTING A LIQUID LEAK

(71) Applicant: GROHE AG, Hemer (DE)

(72) Inventor: Bert Depiere, Wakkerzeel (BE)

(73) Assignee: GROHE AG, Hemer (DE)

( * ) Notice: Subject to any disclaimer, the term of this patent is extended or adjusted under 35 U.S.C. 154(b) by 153 days.

(21) Appl. No.: 17/155,555

(22) Filed: Jan. 22, 2021

(65) Prior Publication Data

US 2021/0231519 A1    Jul. 29, 2021

(30) Foreign Application Priority Data

Jan. 24, 2020 (DE) .......................... 102020101694.8

(51) Int. Cl.
    *G01M 3/26*      (2006.01)
    *F17D 5/02*      (2006.01)
    *G08C 17/02*     (2006.01)
    *E03B 7/07*      (2006.01)

(52) U.S. Cl.
    CPC ............... *G01M 3/26* (2013.01); *E03B 7/071* (2013.01); *G08C 17/02* (2013.01)

(58) Field of Classification Search
CPC . G01M 3/00; G01M 3/26; G01M 3/28; G08C 17/02; E03B 7/07; E03B 7/071; F17D 5/00; F17D 5/02
See application file for complete search history.

(56) References Cited

U.S. PATENT DOCUMENTS

2020/0209095 A1*   7/2020   Swissa ................. G08B 21/20
2020/0217744 A1*   7/2020   Depiere ............. G01M 3/2815

FOREIGN PATENT DOCUMENTS

CA            2523659 A1 *   4/2007   ............... E03D 1/00
DE     10 2012 103 747     10/2013

* cited by examiner

*Primary Examiner* — Nguyen Q. Ha
(74) *Attorney, Agent, or Firm* — Wenderoth, Lind & Ponack, L.L.P.

(57) ABSTRACT

Device (1) for detecting a liquid leakage, wherein a leakage detection function of the device (1) is lockable so that the leakage detection function is protectable against unauthorized use.

8 Claims, 1 Drawing Sheet

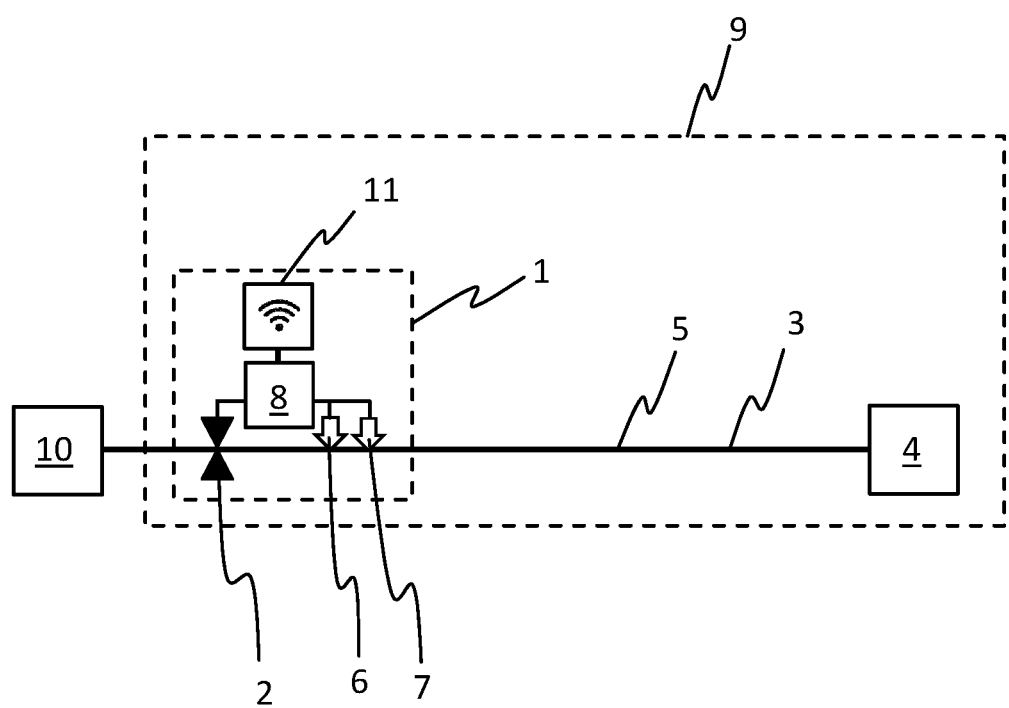

DEVICE FOR DETECTING A LIQUID LEAK

The present invention relates to a device for detecting a liquid leak in a liquid channel. In particular, the device serves to prevent water damage caused by leaking liquids.

In buildings, a plurality of liquid channels is routinely laid, leading from a liquid source, such as a public water supply network, to various consumers, such as sanitary fittings, dishwashers or washing machines. Leaks can occur in these liquid channels, for example in the manner of pipe breaks or cracks through which liquid can leak. The leaking liquid can cause major damage to the building, masonry and/or to facilities of the building at the leakage sites.

For this reason, water meters with a leakage detection function capable of detecting leakages, for example, by means of flow sensors, pressure sensors or other sensors, are already known. However, equipping the water meters with a leakage detection function (optionally with a shut-off function) leads to higher manufacturing costs and thus higher acquisition costs, which must be borne by buyers when acquiring the water meters.

Therefore, the task of the invention is to, at least in part, solve the problems described with reference to the prior art and, in particular, to specify a device for detecting and, if necessary, shutting off a leakage, with the device permitting a reduction in acquisition costs.

Said task is solved by a device according to the features of the independent patent claim.

Further advantageous embodiments of the invention are indicated in the dependently worded patent claims. It should be noted that the features listed individually in the dependently worded patent claims can be combined with one another in any technologically meaningful manner and define further embodiments of the invention. In addition, the features stated in the patent claims are further specified and explained in the description, wherein further preferred embodiments of the invention are presented.

A device for detecting a liquid leakage is helpful in this regard, wherein a leakage detection function of the device is lockable so that the leakage detection function can be protected against unauthorized use.

The purpose of the device is to detect a leakage particularly on a liquid channel that, for example, runs at least partially in a building and/or from a liquid source, such as a public liquid supply network, to at least one consumer, such as a sanitary fitting, a dishwasher or a washing machine. The liquid channel serves, in particular, to conduct a liquid and/or is comprised particularly, at least in part, of plastic or of metal, such as copper. The liquid refers particularly to water. Furthermore, the liquid channel may in particular have a diameter of at least 10 mm (millimeters), preferably 10 mm to 30 mm or particularly preferably (approximately) 0.5" (inches). In particular, the device is connectable to the liquid channel. For this purpose, the device may have a liquid inlet and a liquid outlet. In particular, the liquid may flow from the liquid inlet through the device to the liquid outlet. In particular, the device may constitute a water meter. For this purpose, the device may comprise, for example, a flow sensor by means of which the flow rate of the liquid running through the liquid channel can be determined.

The device has a leakage detection function for detecting the liquid leakage. The leakage detection function can be designed particularly with the aid of a flow sensor, temperature sensor, vibration sensor, acoustic sensor and/or other sensors for detecting a leakage. For example, the leakage detection function may be provided with a valve and a pressure sensor. While the leakage is being detected, in step a), the liquid channel can be closed, for example, with the valve. In particular, the valve can be an electrically actuated valve, for example, in the manner of a solenoid valve or ball valve. This actuation separates at least one liquid consumer from the liquid source, creating a pressurized space in the liquid channel between the closed valve and at least one (closed) consumer.

Thereafter, in step b), a first pressure drop in the pressurized space of the liquid channel can be determined by means of the pressure sensor. This is achieved, in particular, by measuring the pressure in the pressurized space over a predetermined measurement period, wherein the pressure drop is the gradient of the pressure during the measurement period. The pressure is measured, in particular, using the pressure sensor arranged on the liquid channel and/or in the pressurized space of the liquid channel or in the device.

Once the determination of the first pressure drop has been completed, the valve can be reopened in step c) and re-closed after a predetermined period of time has elapsed in step d) to re-create the pressurized space in the liquid channel. After the liquid channel has been reclosed in step d), a second pressure drop can be determined in the pressurized space of the liquid channel in step e). The second pressure drop is determined particularly in the same way as the first pressure drop was. After determination of the second pressure drop has been completed, the first pressure drop can be compared with the second pressure drop in step f). Steps a) to f) can thus be performed, in particular, sequentially or in chronological order. The comparison is performed, in particular, with the aid of the device's microcontroller, which is connected particularly in a data-carrying manner to the pressure sensor and by means of which the valve can be actuated. If the first pressure drop and the second pressure drop are (essentially) identical, this indicates a drip leakage. If, on the other hand, the first pressure drop and the second pressure drop are different, this suggests a deliberate liquid withdrawal by at least one consumer. In this case, there is no drip leakage.

In the event of a leakage, the device can particularly issue an alarm signal by means of which a user or an occupant of the building can be notified of the leakage. Furthermore, in the event of a leakage, the device can particularly shut off the liquid channel, for example by means of the valve. The leakage detection function can thus particularly also comprise a shut-off function for the liquid channel.

The leakage detection function of the device is lockable, thus protecting the leakage detection function against unauthorized use. "Lockable" in this context particularly means not only that the leakage detection function can be deactivated or switched off, but also that it cannot be activated without the (verified or verifiable) existence of an authorization for use. This can mean, in particular, that the leakage detection function can be activated only after proof of authorization to use the system has been furnished. The authorization to use the leakage detection function can, for example, be verifiable and/or controllable by means a controller of the device or an external control system of the device. For this purpose, the controller may, for example, comprise a microprocessor and/or be set up to apply or perform cryptographic methods. Furthermore, the controller may, for example, be designed as a cloud system and/or be implemented in a cloud environment.

The leakage detection function can be enabled or "unlocked," for example, by entering a pin code or transmitting a pin code to the device, using a security token, and/or using the cloud. The leakage detection function may, for example, be capable of being unlocked or enabled for a limited period, for example, during vacation, during extended absence, on certain days, while renting an apartment, while renting a hotel room, or at certain times. The lockability of the leakage detection function enables a usage-dependent calculation of the leakage detection function. This allows for the acquisition costs of the device to be reduced by a post hoc calculation regarding the usage of the leakage detection function. The calculation regarding the usage of the leakage detection function can be made to the user or owner of the device or to a third party.

The leakage detection function can be mechanically lockable or unlockable. For this purpose, the device can be provided with a lock, for example. The leakage detection function can be authorized for use, in particular, by means of a key, especially a mechanical key, which can be used to move the lock into an unlocked position.

The leakage detection function can be electronically lockable or unlockable. For this purpose, for example, an (electronic) lock signal and/or unlock signal can be transmitted to the device. The lock signal and/or unlock signal can, for example, be an (electronic) character combination.

The leakage detection function can be lockable or unlockable by an electronic key. The electronic key can, in particular, be an (electronic) character combination.

The leakage detection function can be disabled in the ex factory condition of the device. The ex factory condition refers, in particular, to a state prior to the device being put into operation for the first time.

The device can be provided with a communication device by means of which the locking or unlocking of the leakage detection function can be controlled remotely. The communication device is used, in particular, for data communication and/or can be designed in the manner of a communication interface, such as an Ethernet interface, LAN interface, WAN interface, WLAN interface, Bluetooth interface and/or the like. The communication device allows for the device to be connected particularly to a smartphone or a remote data processing system, for example a server or cloud solution. In addition, the alarm signal, in particular, can be transmissible by means of the communication device.

The device may be connectable to a liquid channel.

The device can be designed in the manner of a liquid meter. Using the liquid meter allows particularly for the determination of a volume of liquid flowing through the liquid channel. For example, the liquid consumption of at least one consumer or liquid consumption unit, such as a residential building, business building, apartment or hotel room, can be determined by means of the liquid meter. The liquid meter can, in particular, be a water meter. The water consumption determined by the device can particularly be digitally transmittable and/or readable. In particular, locking or deactivating the leakage detection function of the device does not deactivate the liquid counter or a liquid counting function of the device. For this reason, the device can particularly be used also as a liquid meter or water meter even when the leakage detection function is disabled or deactivated. The device can therefore replace a standard water meter.

Most particularly, the device proposed herein is one that is provided with a controller, wherein the controller has been set up to execute the following process steps:
 a) receive an electronic unlock signal or lock signal,
 b) check the unlock signal or lock signal, and
 c) enable or disable the leakage detection function depending on the check in step b).

The device may additionally comprise, in particular, a liquid channel, a valve for shutting off the liquid channel, a sensor such as a temperature sensor, an acoustic sensor, a vibration sensor, a sensor for determining a water quality (for example, for acid, salt, limestone, and/or the like), and/or a flow rate sensor for measuring the flow rate of a liquid through the liquid channel. In particular, a microprocessor of the controller has been set up to perform the process steps. The lock signal and/or unlock signal can be, for example, an (electronic) character combination. In step b), a check can be performed particularly to determine whether the unlock signal or the lock signal was sent by a source authorized to enable or disable the leakage detection function or leakage detection function unit. If the check reveals that the unlock signal or the lock signal originates from a source authorized to enable or disable the leakage detection function, the leakage detection function will be enabled or disabled in step c). If the check shows that the unlock signal or lock signal does not originate from a source authorized to enable or lock the leakage detection function, execution of step c) will be disabled so that the original status (locked or unlocked) of the leakage detection function is not changed.

In the following, the invention and the technical environment are explained in more detail with reference to the illustration. It should be noted that the illustration shows a particularly preferred embodiment of the invention, however, without being limited thereto. By way of example, it shows schematically:

FIG. 1: A device for detecting a liquid leak in a liquid consumption unit.

FIG. 1 shows a schematically illustrated device (1) in a liquid consumption unit (9), which may, for example, be a residential building. The device (1) is arranged in a liquid channel (5), through which liquid can be conducted from a liquid source (10) to at least one consumer (4). In addition, the device (1) comprises a flow sensor (6), by means of which the flow rate of the liquid flowing through the liquid channel (5) can be determined. Here, the device (1) is therefore designed in the manner of a liquid meter, by means of which the liquid consumption of at least one consumer (4) or the liquid consumption unit (9) can be determined. For this purpose, the device (1) can be supplied with electrical energy by means of an energy source not shown here, for example in the manner of a (rechargeable) battery or a public energy supply network. Furthermore, the device (1) is provided with a valve (2) in the manner of a solenoid valve, by means of which the liquid channel (5) can be closed off when a leakage is detected. For detecting the leakage, the device (1) has a leakage detection function. The leakage detection function of the device (1) can be supplied with electrical energy by the energy source of the device (1) or by another energy source, for example by way of a PowerNet. If a different energy source is being used, said source can also be employed to charge a rechargeable battery of the device (1). For the purpose of implementing the leakage detection function, in the embodiment of the device (1) shown here, the valve (2) can be closed to form a pressurized space (3) in the liquid channel (5). In this case, the pressurized space (3) extends from the valve (2) to the consumer (4). Furthermore, the device (1) is provided with a pressure sensor (7), by means of which a pressure and thus a pressure drop in the pressurized space (3) can be determined after closing the liquid channel (5) with the valve (2). The closing of the liquid channel (5) by means of the valve (2) takes place once the flow sensor (6) of the device (1) has determined that no liquid is being withdrawn via the liquid channel (5) from the liquid source (10) by at least one consumer (4). The valve (2), the flow sensor (6) and the pressure sensor (7) are connected in a data-carrying manner to a controller (8) of the water meter (5) wirelessly or by radio connection. The controller (8) is also connected to a communication device (11), by means of which a locking or unlocking of the leakage detection function can be controlled remotely. For this purpose, the controller (8) can establish a connection to a control system, which is not shown here, via the communication device (11), for example via the internet.

The present invention can reduce the initial cost of a device for detecting a liquid leak.

LIST OF REFERENCE SIGNS

1 Device
2 Valve
3 Pressurized space
4 Consumer
5 Liquid channel
6 Flow sensor
7 Pressure sensor
8 Controller
9 Liquid consumption unit
10 Liquid source
11 Communication device

The invention claimed is:

1. A device for detecting a liquid leakage, comprising a leakage detection function,
    wherein the leakage detection function of the device (1) is lockable so that the leakage detection function can be protected against unauthorized use, and
    wherein the leakage detection function is locked in an ex-factory state of the device (1).

2. The device (1) according to claim 1, wherein the leakage detection function can be mechanically locked or unlocked.

3. The device (1) according to claim 1, wherein the leakage detection function is electronically lockable or unlockable.

4. The device (1) according to claim 1, wherein the leakage detection function is lockable or unlockable by an electronic key.

5. The device (1) according to claim 1, comprising a communication device (11) by means of which a locking or unlocking of the leakage detection function can be controlled remotely.

6. The device (1) according to claim 1, wherein the device (1) is connectable to a liquid channel (5).

7. The device (1) according to claim 1, wherein the device (1) is designed in the manner of a liquid meter.

8. The device (1) according to claim 1, comprising a controller (8), wherein the controller (8) is set up to perform the steps:
    a) receiving an electronic unlock signal or lock signal,
    b) checking the unlock signal or lock signal, and
    c) enabling or unlocking the leakage detection function depending on the check in step b).

* * * * *